US009055409B2

(12) United States Patent (10) Patent No.: US 9,055,409 B2
Hatton et al. (45) Date of Patent: Jun. 9, 2015

(54) METHOD AND APPARATUS FOR ROADSIDE ASSISTANCE FACILITATION

(75) Inventors: David Anthony Hatton, Berkley, MI (US); David Chronowski, Harrison Township, MI (US); Chad Evert Esselink, Canton, MI (US); Ninos Ziazadeh, Farmington Hills, MI (US); George Edward Kimmerling, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/405,476

(22) Filed: Feb. 27, 2012

(65) Prior Publication Data

US 2013/0225111 A1 Aug. 29, 2013

(51) Int. Cl.
  *H04M 11/04* (2006.01)
  *H04W 4/04* (2009.01)
  *G07C 5/00* (2006.01)

(52) U.S. Cl.
  CPC .............. *H04W 4/046* (2013.01); *G07C 5/008* (2013.01)

(58) Field of Classification Search
  CPC ................................ G07C 5/008; H04W 4/046
  USPC .............. 701/24, 31.4, 31.5, 31.7, 32.7, 33.2
  See application file for complete search history.

(56) References Cited

U.S. PATENT DOCUMENTS

| | | | |
|---|---|---|---|
| 5,572,670 A * | 11/1996 | Puckett | 714/46 |
| 6,028,537 A | 2/2000 | Suman et al. | |
| 6,757,378 B1 * | 6/2004 | Kunisch | 379/377 |
| 6,828,924 B2 | 12/2004 | Gustavsson et al. | |
| 8,805,603 B1 * | 8/2014 | Cavallaro Kozlowski et al. | 701/24 |
| 2004/0198441 A1 * | 10/2004 | Cooper et al. | 455/557 |
| 2005/0113991 A1 * | 5/2005 | Rogers et al. | 701/29 |
| 2005/0222933 A1 * | 10/2005 | Wesby | 705/36 |
| 2006/0291633 A1 * | 12/2006 | Glaza et al. | 379/112.02 |
| 2007/0244628 A1 * | 10/2007 | Rockett et al. | 701/117 |
| 2008/0281734 A1 * | 11/2008 | Longe et al. | 705/31 |
| 2008/0305782 A1 * | 12/2008 | Guedalia et al. | 455/414.2 |
| 2009/0197593 A1 * | 8/2009 | Farrell et al. | 455/426.1 |
| 2009/0233572 A1 | 9/2009 | Basir | |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Magdi Elhag
(74) *Attorney, Agent, or Firm* — Jennifer M. Stec; Brooks Kushman P.C.

(57) ABSTRACT

A roadside assistance system includes a vehicle computing system (VCS), an intermediate system, operable to communicate with the VCS and at least one backend system, and a backend roadside assistance processing system, operable to receive data from the intermediate system and operable to receive calls from the VCS. The VCS is operable to establish communication with the intermediate system. The VCS is further operable to transfer data to the intermediate system, to place a call to the backend roadside assistance processing system, and to relay at least a MIN to the backend roadside assistance processing system. The intermediate system is operable to process transferred data and relay data to the backend roadside system. The backend roadside system is operable to compare the MIN relayed from the VCS with data received from the intermediate system to formulate a dispatch order and to dispatch roadside assistance in accordance with the dispatch order.

5 Claims, 7 Drawing Sheets

(56) References Cited

U.S. PATENT DOCUMENTS

| | | | |
|---|---|---|---|
| 2010/0036877 A1* | 2/2010 | McDermott et al. | 707/104.1 |
| 2010/0191403 A1* | 7/2010 | Krause | 701/29 |
| 2011/0093160 A1* | 4/2011 | Ramseyer | 701/33 |
| 2012/0225634 A1* | 9/2012 | Gee et al. | 455/404.2 |
| 2012/0252475 A1* | 10/2012 | Farrell et al. | 455/450 |

OTHER PUBLICATIONS

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

* cited by examiner

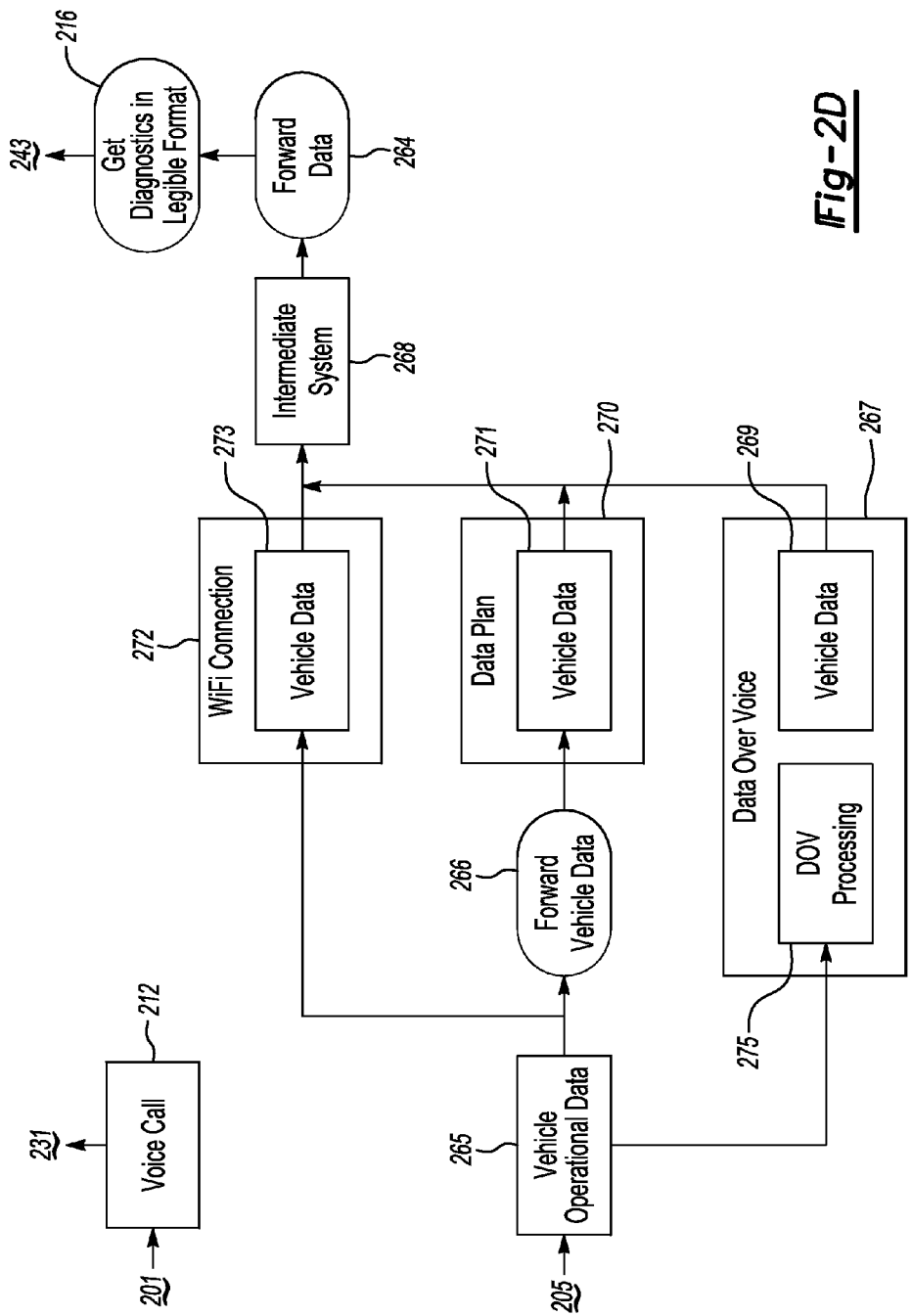

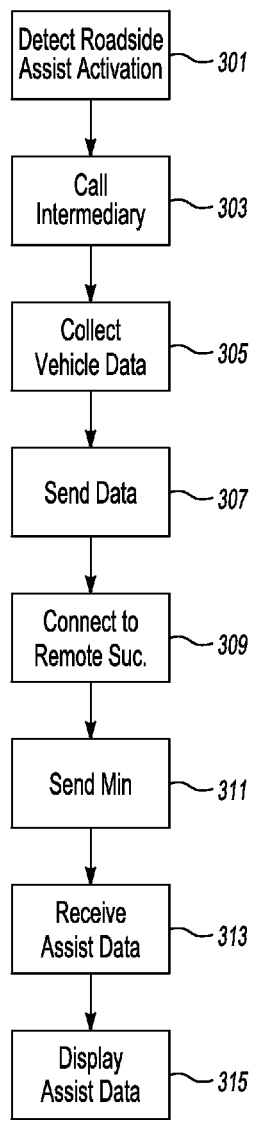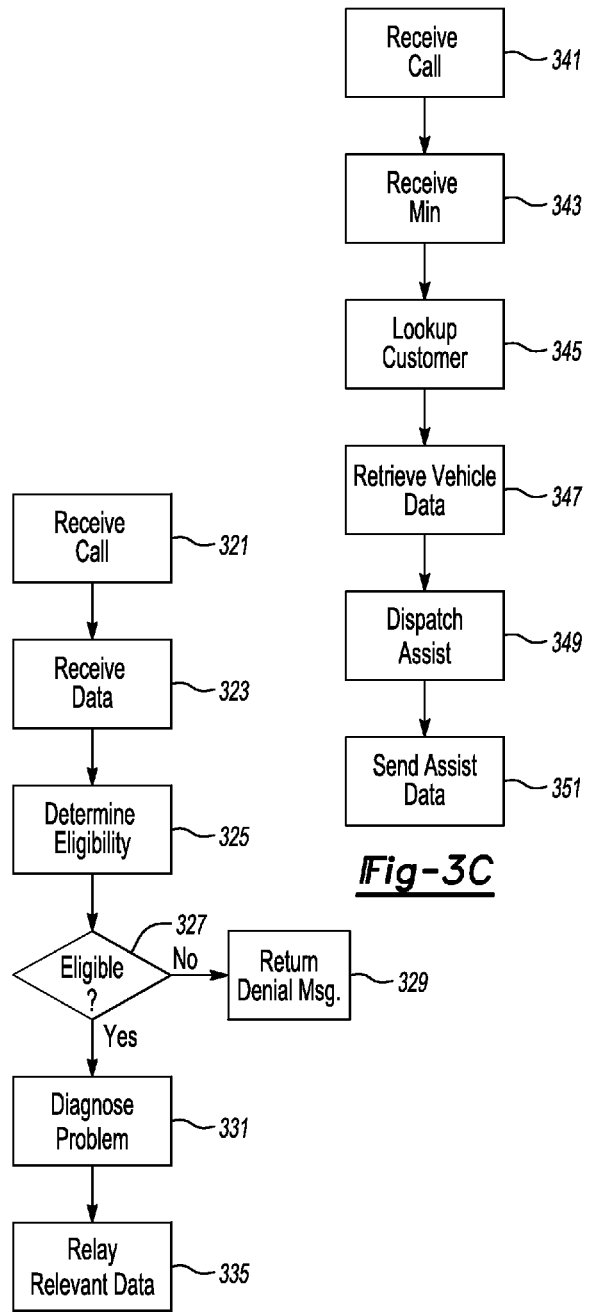
Fig-3A
Fig-3B
Fig-3C

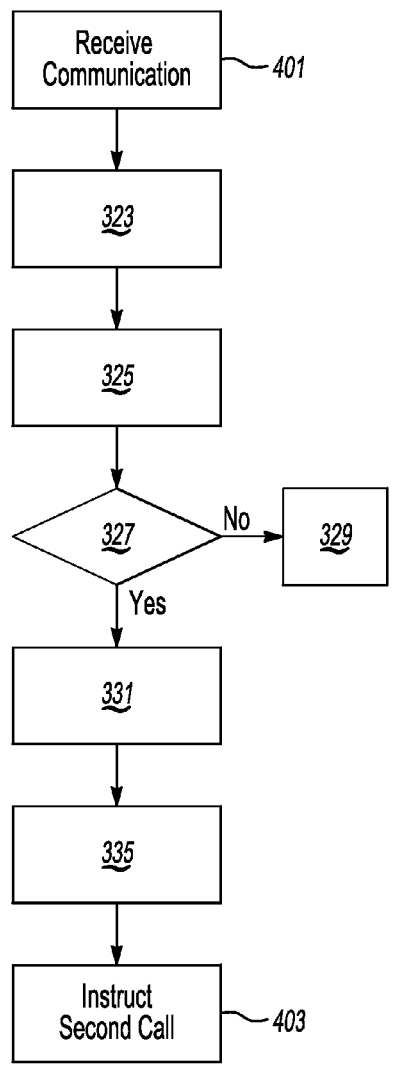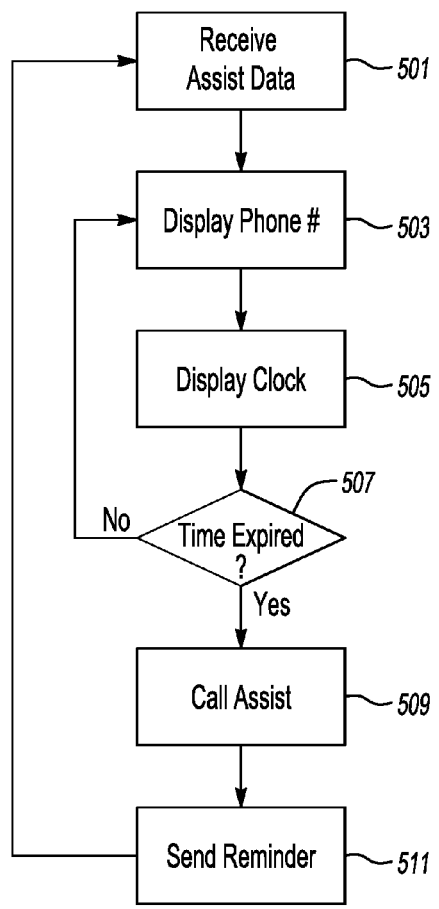
Fig-4
Fig-5

METHOD AND APPARATUS FOR ROADSIDE ASSISTANCE FACILITATION

TECHNICAL FIELD

The illustrative embodiments generally relate to a method and apparatus for roadside assistance facilitation.

BACKGROUND

U.S. Application Publication 2009/0233572 discloses: "A system for providing roadside and emergency assistance to a vehicle includes a vehicle unit with several connectivity options. A user interface unit permits a user to request assistance and communicate with an emergency dispatcher and/or service provider. A server receives requests for assistance from the vehicle unit and relays information between the vehicle unit and a dispatcher or service provider to provide communication between the driver of the vehicle and the dispatcher or service provider. Alternatively, such as in an emergency (e.g. crash) situation, the server directly requests assistance to be sent to the vehicle."

U.S. Pat. No. 6,028,537 discloses: "The vehicle communication and control system of the present invention includes a transceiver for sending and receiving RF signals, a processor coupled to the transceiver, a location identifying sensor coupled to the processor for supplying vehicle location data, a user interface coupled to the processor for providing information to a user and for enabling a user to input commands to be executed by the processor, and a vehicle accessory interface for coupling the processor to a vehicle accessory control circuit to enable the processor to issue commands to a vehicle accessory. The processor is preferably adapted to perform a wide variety of functions in response to user input commands, received RF signals, and other commands received from other vehicle accessories and components coupled to the system of the present invention through the vehicle system bus. Some of these functions include establishing a two-way communication link, requesting and providing location-specific information, enabling remote tracking of the vehicle, issuing an emergency request or a request for roadside assistance, requesting and receiving navigational information, remote control of vehicle functions, enabling remote diagnostics of the vehicle, and enabling reprogramming of various vehicle accessories and components."

While various approaches have been taken with respect to roadside assistance and vehicles over the years, evolving technology and communication options have opened the door for faster, more efficient and more comprehensive assistance solutions.

SUMMARY

In a first illustrative embodiment, a roadside assistance system includes a vehicle computing system (VCS), operable to wirelessly communicate with one or more remote systems through a wireless connection established with a wireless device. The system also includes an intermediate system, operable to communicate with the VCS and at least one back-end system. The system further includes a backend roadside assistance processing system, operable to receive data from the intermediate system through a data connection and operable to receive phone calls from the VCS.

The VCS is operable to establish communication with the intermediate system responsive to a roadside assistance request. The VCS is further operable to transfer vehicle and customer data to the intermediate system. The VCS is further operable to place a phone call to the backend roadside assistance processing system. The VCS is further operable to relay at least a mobile identification number to the backend roadside assistance processing system.

The intermediate system is operable to process transferred data and relay transferred data to the backend roadside system. The backend roadside system is operable to compare the mobile identification number relayed from the VCS with data received from the intermediate system to formulate a dispatch order. The backend roadside system is further operable to dispatch roadside assistance in accordance with the dispatch order.

In a second illustrative embodiment, a computer implemented method includes receiving a request for roadside assistance at a vehicle computing system (VCS). The method also includes establishing a first communication with an intermediate system and relaying vehicle data from the VCS to the intermediate system for processing. The method further includes establishing a second communication with a roadside assistance center. The method includes relaying customer data to the roadside assistance center for processing. Also, the method includes providing an open line for communication between the customer and the roadside assistance center.

In a third illustrative embodiment, a computer implemented method includes receiving a call from a vehicle computing system (VCS) relaying a request for roadside assistance. The method further includes receiving data from an intermediate source, the data having been sent to the intermediate source by the VCS. Also, the method includes correlating the received phone call and received data. The method further includes verifying customer assistance eligibility based at least in part on the data. Also, the method includes, automatically dispatching roadside assistance to assist a customer, contingent on customer assistance eligibility.

BRIEF DESCRIPTION OF THE DRAWINGS

FIGS. 2C-2E show illustrative examples of roadside assistance request processing flows;

FIGS. 3A-3C show an illustrative examples of roadside assistance request handling processes;

FIG. 4 shows an illustrative example of a roadside assistance request processing process; and FIG. 5 shows an illustrative example of a roadside assistance update process.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
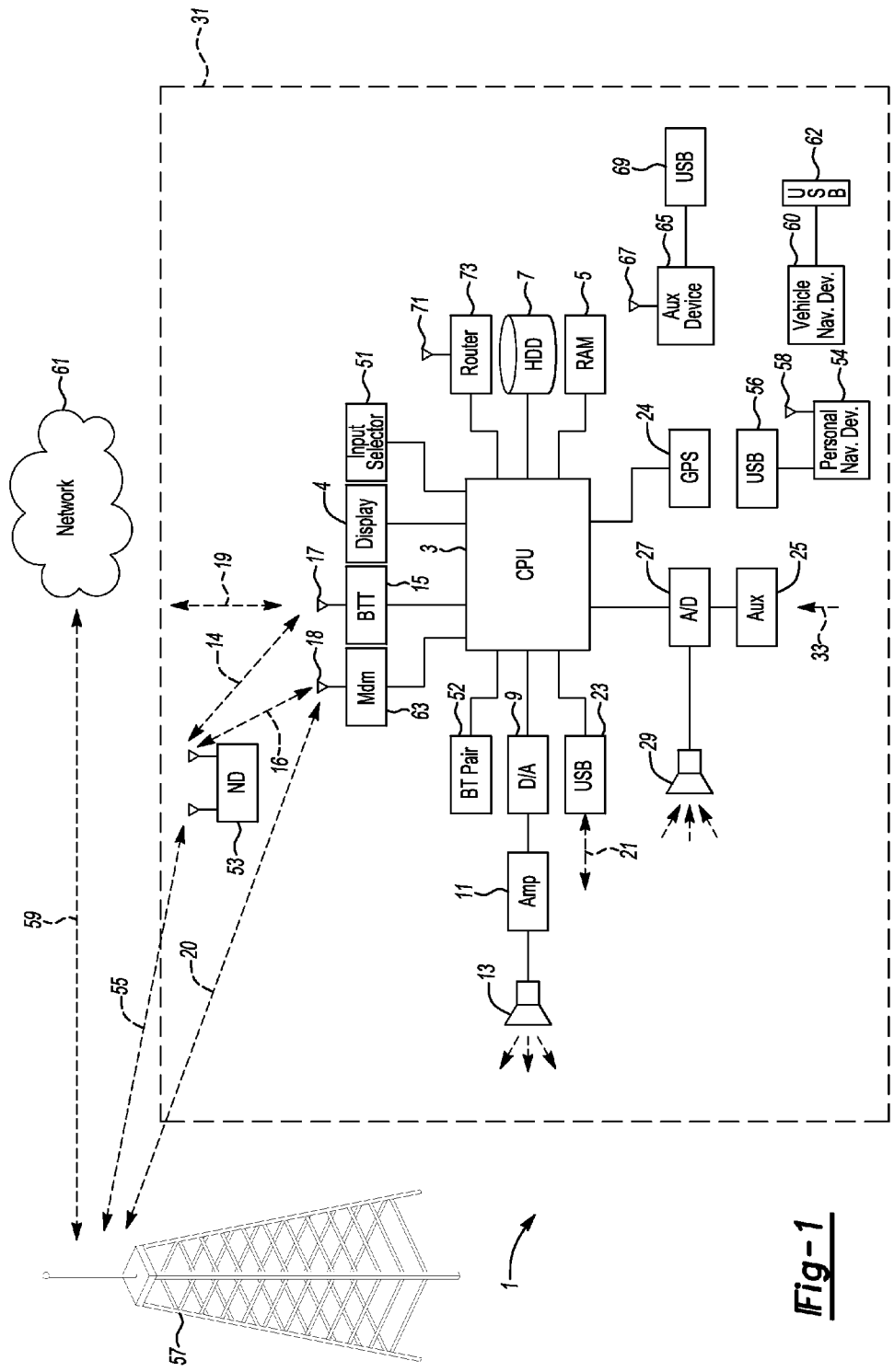
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Many vehicles come with one or more types of roadside assistance plans available for customer purchase or activation. Ranging from connecting a customer to a technician who can provide vehicle advice, to tow services, to comprehensive, on-site plans, options for roadside assistance are often numerous and varied.

Because of the vast number of vehicles sold by manufacturers/dealers, because some plans are transferrable and others may not be, and because the options associated with a particular plan may vary from vehicle to vehicle, it is useful to be able to quickly and easily recall information relating to a particular customer and/or their plan. In many instances, this involves a complicated lookup process performed by a human operator.

Vehicle maintenance information, eligibility information, customer information, vehicle diagnostic information (if available), dealer location/information and a host of other information may be desired to successfully process a roadside assistance call. If some of this information is unavailable, however, an assistance provider may elect to proceed despite the unavailability or to deny the request in light of the unavailability.

In the former case, ineffective or improper assistance may be provided, either irritating a customer or costing an manufacturer/dealer/provider money in providing service for which a customer is ineligible. In the latter case, refusal of service for which the customer knows/believes they are eligible may further irritate a possibly already irritated customer. In either event, undesirable outcomes are possible and/or likely, and a comprehensive, easily accessible, fast system would facilitate greater satisfaction for all parties involved.

Figure 2A:
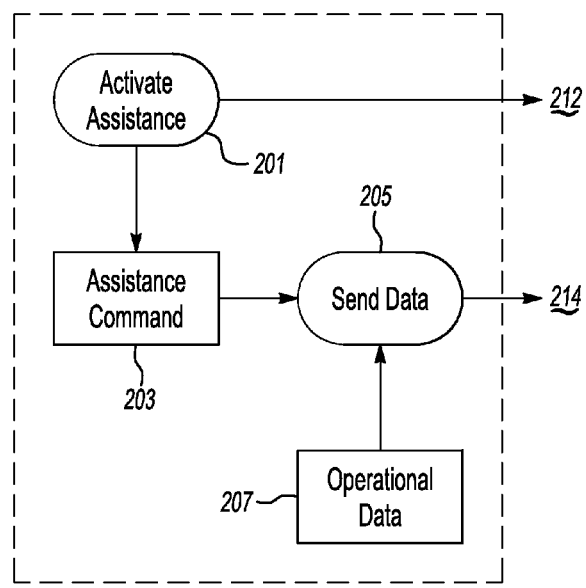
FIG. 2A shows an illustrative example of roadside assistance request flow at a vehicle computing system.

FIG. 2A shows an illustrative example of roadside assistance request flow at a vehicle computing system. In at least one embodiment, a vehicle computing system, either automatically or at the request of a customer, is capable of placing a roadside assistance request. Activation of roadside assistance 201 causes the processing of a roadside assistance command 203.

In this illustrative example, processing the roadside assistance command causes a variety of desirable data to be sent to one or more remote sources 205. This data is drawn, for example, without limitation, from vehicle operational data 207 available on vehicle networks (such as, but not limited to, a CAN bus). The data may include, but is not limited to, vehicle sensor data, onboard diagnostic data, fuel levels, odometer readings, tire pressures, restraint control module signals, and any other relevant or desired vehicle or occupant related data. In certain vehicles, data about the specific occupants may be known, including, but not limited to, medical data, emergency contact data, etc.

Figure 2E:
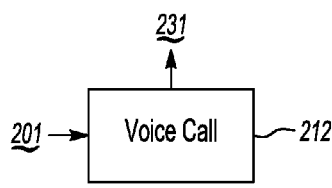
Figure 2E:
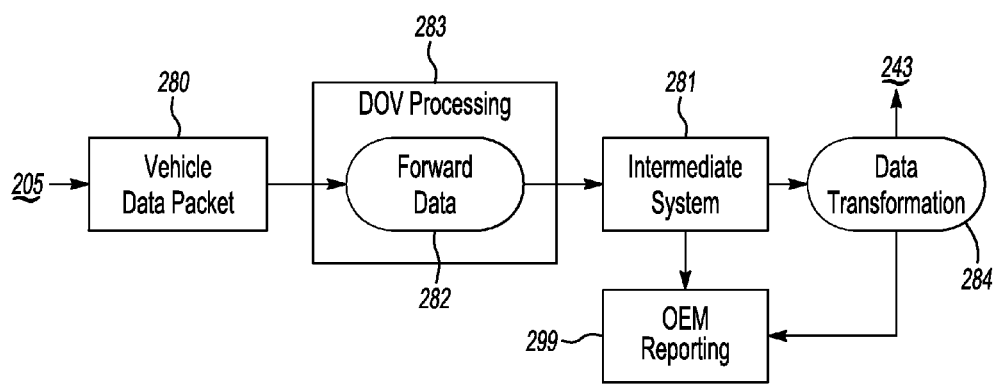
Figure 2B:
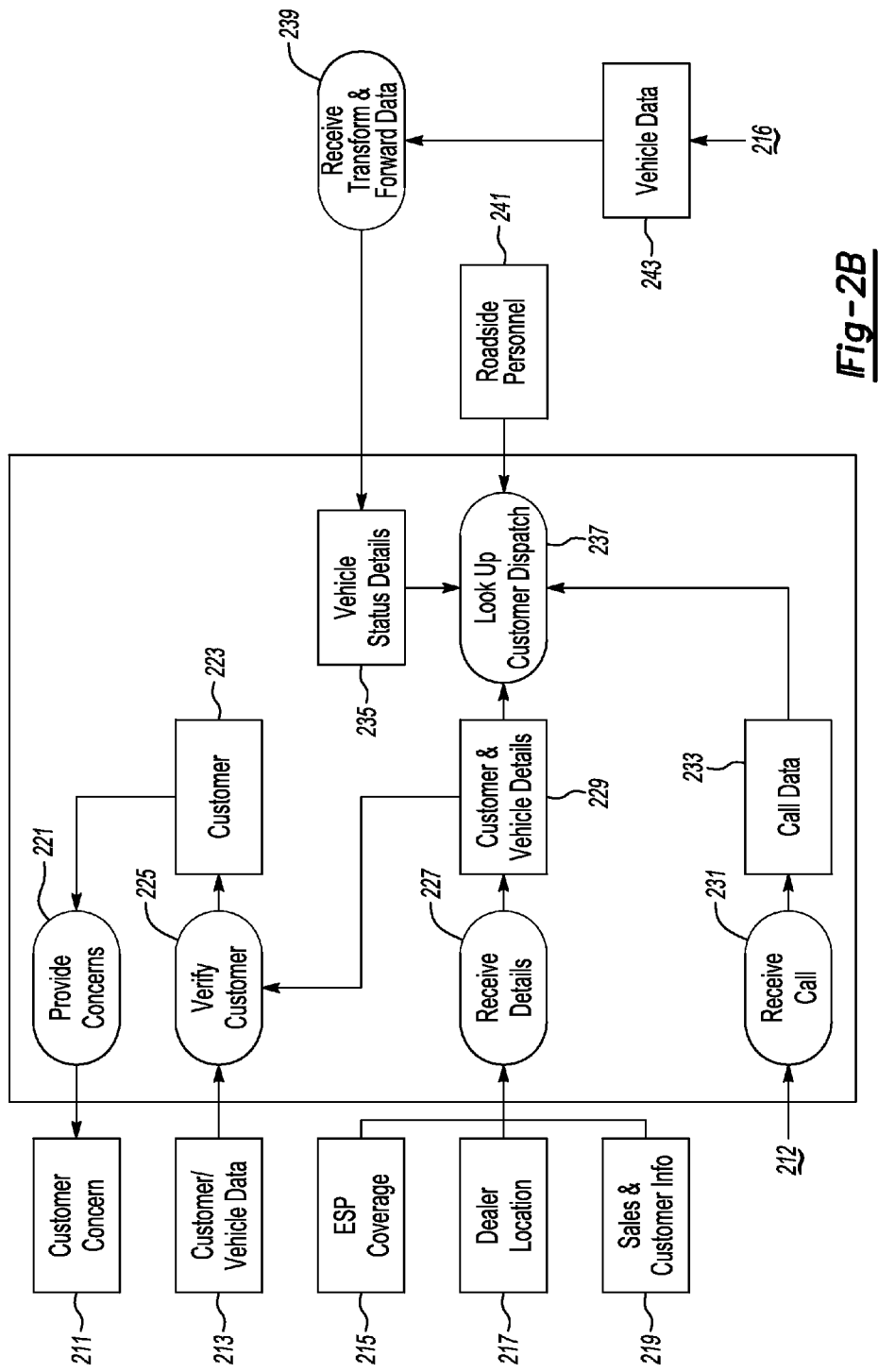
FIG. 2B shows an illustrative example of a roadside assistance back-end flow.

FIG. 2B shows an illustrative example of a roadside assistance back-end flow. In this illustrative example, a back end system/flow for comprehensive data provision to a roadside assistance provider is shown. Extended service plan data 215, dealer location/data 217 and sales and customer information 219 are just a few of the possible "remote" data elements accessible automatically by the roadside assistance provider. Additionally, this exemplary system allows updating of customer and vehicle data 213 (from, for example, customer calls, roadside assist calls, dealership visits, etc.).

The customer and vehicle data is verified against an existing customer record using, for example, a VIN (to ensure the proper vehicle is correlated to the reported data). Along with existing customer data 223, any new concerns or issues are transferred 221 to a customer information data store, where they can later be accessed in the event of a future roadside assistance call. This "concern" reporting process can also immediately process data relating to any roadside assistance call in progress to add it to a customer record.

The stored data 215, 217 and 219, along with any other related data desired, can be sent in detail 227 to a roadside assistance processing point to accumulate a customer/vehicle record 229 for use in processing a roadside assistance request. A call/communication coming into the roadside assistance center 231 may include some data of its own 233 and this data and call can be handled in an aggregated manner with all desirable existing customer data so that a customer can easily be looked up, verified and assistance can be dispatched 237. In addition, the look-up/dispatch process may include additional vehicle related data 235 about a current status of the vehicle, which, in this case, has been relayed to the process through a request processing flow (as opposed to being transferred directly with the call).

Prior to delivery to the roadside assistance center, the vehicle related data was transformed, in this example, into easily readable and understandable plain English 239, so that the processor/dispatcher can understand what potential issues need to be addressed by service personnel. This data 243 was relayed from an intermediate processing system, which, among other things, can allowed a dealer/OEM to further receive data relating to vehicles in service and potentially diagnose and address commonly occurring problems, for example.

Figure 2C:
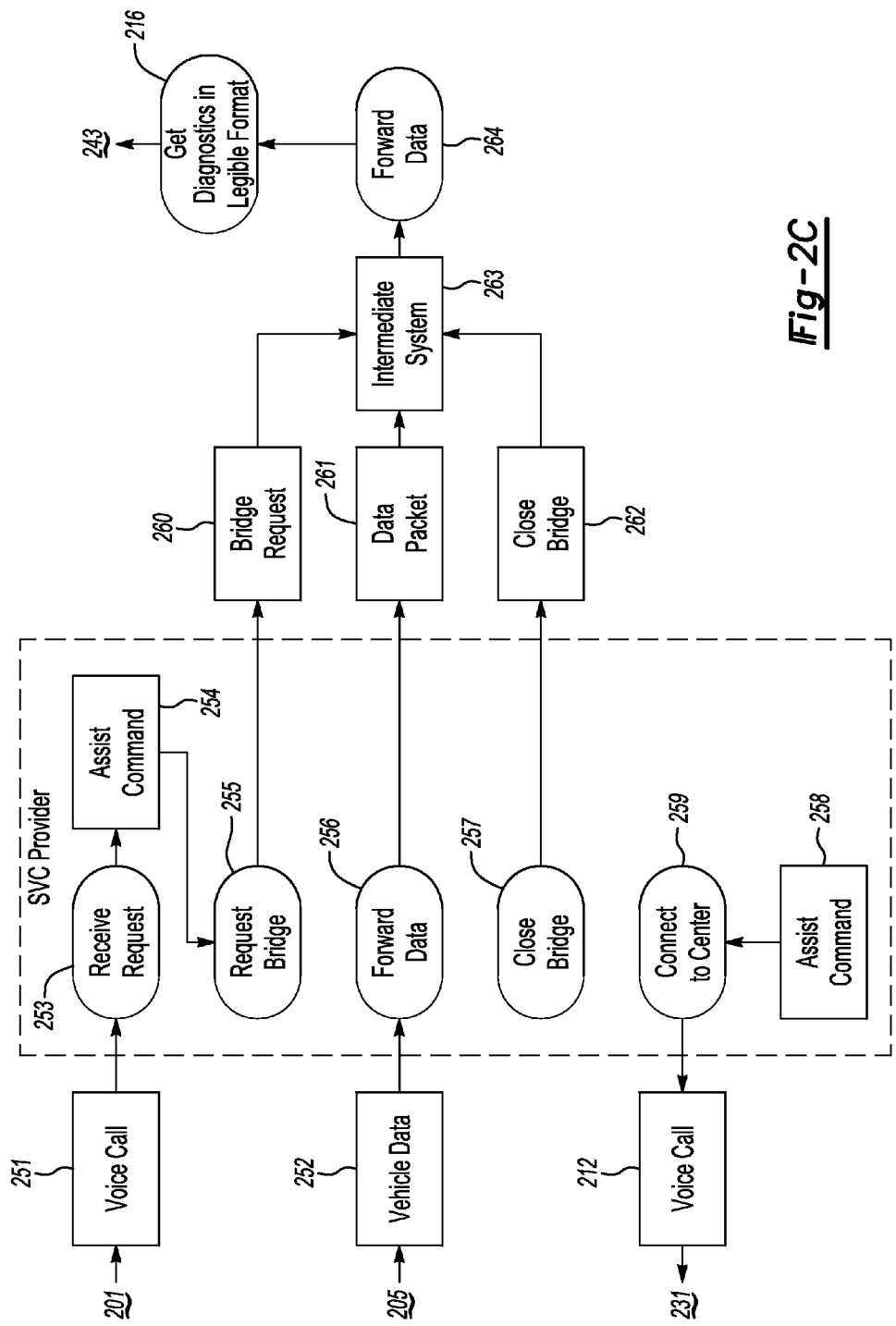

FIGS. 2C-2E show illustrative examples of roadside assistance request processing flows. In FIG. 2C, and intermediary menu-driven service provider is in communication with the VCS. In this instance, a voice call 251 is used to transfer data 252, the data transfer being facilitated in a data-over-voice manner.

The process receives a call 253 initiating an internal roadside assist command 254, which may then cause a bridge request 260 with an intermediary system. The bridge may be opened, for example, to facilitate transfer of incoming vehicle data to the intermediate system 263. Once the bridge request 260 has been sent/processed by the intermediate system, and a bridge is open, data 252 sent to the service provider can be forwarded 256 by the service provider in the form of one or more data packets 261 to the intermediate system 263.

Once all data has been forwarded, the service provider can request 257 that the bridge be closed, and a close bride command 262 can be processed by the intermediate system, terminating the data connection.

In addition to handling the initial request call 251 and data transfer 252, the service provider can also recognize that processing of an assist command 258 may require that a connection to a roadside assistance center be established 259. A voice call (and any associated data) 212 may be processed, allowing the vehicle occupant to receive information pertaining to available services and specific dispatches.

At the same time, the intermediate system may utilize the data for reporting purposes, as well as forward the data 265 and translate any diagnostics into a usable format 216.

In the examples shown in 2C-2E, several different intermediate systems 263, 268, 281 are shown. In addition to providing data forwarding capability, these systems may be used by OEMs to record roadside assistance calls and transferred vehicle diagnostic data. Mileage reported when roadside assist calls may be monitored, general roadside usage may be monitored, diagnostic information may be monitored. In some instances, vehicle warranty data may be updated, vehicle operational data may be recorded, and roadside assistance reports may be compiled for examination by OEM product managers. Other reporting/data may also be done as desired. Although not required to process a roadside assistance request, all this reporting and recording of data allows OEMs to provide advanced levels of vehicle servicing and customer satisfaction and may generally result in a happier, more satisfied customer.

FIG. 2D shows an illustrative example where vehicle data 265 can be transferred to an intermediate system in a variety of manners. It may be the case that a certain manner providing higher bandwidth is selected if available, for faster and maybe even more comprehensive data transfer, whereas a secondary system may be used if the faster system is not available.

For example, if a WiFi connection 272 is available for use by a vehicle computing system, the data 272 may be transferred to the intermediate system 268 using a WiFi connection. Or, for example, if a wireless device with a data-plan is detected in communication with the VCS, a command to forward vehicle data 266 from the wireless device may be processed by/sent to the wireless device and a device data plan 270 may be used to forward vehicle data 271.

Or, if a data over voice DOV 267 transfer is desired/available, the operational data 265 may be sent to a DOV processing engine 275, which receives the data over a voice channel and then forwards the data 269 to the intermediate system 268.

Once the data has been relayed for processing and forwarding, the system may also connect a voice call 212 so that the occupant of the vehicle and the VCS can communicate with an assistance dispatch/backend for sending and receiving information relating to an assistance request.

FIG. 2E shows another illustrative example of a system where DOV is the only option for vehicle data relay. In this illustrative example, a vehicle data packet 280 is sent in DOV format to a DOV processing engine 283, which is capable of receiving data sent over a voice channel. The data processing engine 283 handles the data packet and then relays the data 282 to an intermediate system 281. As previously noted, the intermediate system(s) may report the data to an OEM 299 (or dealer, etc.) as well as transform the data 284 for further relay 243 to a roadside assistance provider. Transformed data may also be reported to an OEM backend system 299.

In addition to processing the data, this system will cause a voice call 212 to be placed to a back-end roadside assistance provider so that information can be exchanged between the service provider and a customer/vehicle.

FIGS. 3A-3C show an illustrative examples of roadside assistance request handling processes.

FIG. 3A, for example, shows an illustrative embodiment of a process for a VCS (or similar computing system, be it on a wireless device or remote, acting in response to a request from the VCS) handling of a roadside assistance request. In this exemplary process, the computing system 301 detects an activation (manual or automatic) of a roadside assistance request 301.

In response to the activation, the system first contacts an intermediate system 303 and collects vehicle data 305 for relay to the intermediate system. As was seen with respect to FIGS. 2A-2E, the data relayed to the intermediate system can be subsequently sent to a remote service provider who will dispatch the roadside request.

The relevant, collected vehicle data is then sent to the intermediate system 307 and a second connection is established with the remote roadside assistance service provider 309. This connection can be used to communicate information between a customer/vehicle and a roadside assistance provider. In this example, a mobile identification number (MIN) is sent to the roadside assistance provider 311. This MIN has also been sent previously to the intermediate system, and is forwarded along with the vehicle data received by the roadside assistance provider. In this manner, the caller can be correlated with incoming vehicle diagnostic data, and the MIN and a VIN (associated with the diagnostic data) can be used to look up customer related data files to determine level of service, eligibility and vehicle maintenance and status.

Relevant vehicle assistance data may then be received by the customer. This data could be as simple as an operator informing the customer of a dispatch, and could also include, but is not limited to, data for processing by the VCS, eligibility/ineligibility information, projected vehicle problems/diagnostic analysis, etc.

If data for processing by the VCS is received, a vehicle display can then display one or more aspects of projected vehicle assist 315. For example, without limitation, the display could show an estimated service arrival time or timer. This timer could even be updated as a technician draws near, to let a customer know not to step away from the vehicle (if, for example, the vehicle is stopped in proximity to a restaurant or some other "distraction"). Additionally or alternatively, the display could be used to show information usable in solving "simple" vehicle problems.

For example, if a customer was traveling in an unknown location and ran out of gas, the vehicle may be stopped in proximity to, but out of sight of, a gas station. Once the roadside assistance had dispatched or at least diagnosed the problem, information relating to a proximate gas station may be shown. This may give the user the option of simply walking to get gas, as opposed to waiting for assistance. Or the user could elect to walk to a nearby location for food/shelter (as may be shown by the display) and use the connection or display to inform the roadside assistance personnel that the user would like to be met at that location.

FIG. 3B shows an illustrative example of a roadside assist call processing process (which may also be performed, at least in part, by an intermediate system). In this example, a call is received from a vehicle/vehicle computing system and the call includes an identifier (in this case, a MIN). Additionally, the processing center receives vehicle data from an intermediate system 323, the data having been forwarded from the intermediate system after the system received the data from the vehicle. Using data received from the call and/or data forwarded from the intermediate system, the eligibility of a user for assistance is determined 325.

If the user is ineligible for service, a denial message may be returned 329. If, however, the user is eligible 327, a diagnosis of any likely problems may be performed 331 (if the diagnosis was not already performed, or the diagnosis may be confirmed). Relevant data, either received by or gathered by the process in response to the incoming assist call, can then be forwarded to a service technician who will be assisting the vehicle 335.

FIG. 3C shows an illustrative example of another backend process. In this example, the eligibility of the customer has already been confirmed, for example, by an intermediate system. Here, the process receives a roadside assistance request 341. Along with the request, for use as a customer identifier, a MIN is received as well 343. As noted, this can be used to cross reference the request 345 with existing, remote data and with data received from an intermediate system. Once the customer is identified, relevant vehicle data correlating to the customer and/or request can be retrieved for analysis/forwarding 347. Appropriate personnel can then be dispatched to the customer 349, and assist related data can be sent to personnel and/or a customer vehicle/customer 351 if desired.

FIG. 4 shows an illustrative example of a roadside assistance request processing process. In this illustrative example, a vehicle computing system does not automatically place a call to a roadside assistance center after relaying data to an intermediate system. Instead, eligibility may be determined by the intermediate system first, in response to a received assist communication 401 (which may include both vehicle data and call-relay data). If the vehicle is determined to be eligible for servicing, the intermediate system may instruct that a secondary call be placed to a roadside assistance center 403. Such a process may help lighten incoming call burden on a roadside assistance center, or allow calls to be placed to centers that lack verification capability. As this is a modification of the process shown in FIG. 3B, the remainder of the steps in this example are those shown in FIG. 3B, having the corresponding identified elements.

FIG. 5 shows an illustrative example of a roadside assistance update process. In this illustrative example, a vehicle is capable of receiving data relating to a request in progress 501. For purposes of the example only, the data includes an assistance related phone number (such as a phone number of assistance personnel) and an estimated time of arrival. The relevant phone number 503 and time of arrival (or timer) 505 are displayed on, for example, a vehicle infotainment system. This can help the customer determine when assistance should arrive, and give the customer a means of contacting the assistance personnel if a situation changes.

If the time has passed or a timer expires 507, the process can place an automatic call 509 to either a service personnel or a roadside assistance center 509. Additionally or alternatively, an automated reminder (text, data packet, email, etc.) can be sent to one or more service related sources 511. Responsive to the reminder and/or call, updated assistance data 501 may be received and the process may start over.

For example, if assistance personnel are stuck in traffic, this process could serve as a way to automatedly relay and update assistance related data to a customer without causing the customer to have to place calls, wait on hold, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A roadside assistance system comprising:
a vehicle computing system (VCS), configured to wirelessly communicate with one or more remote systems through a wireless connection established with a wireless device;
an intermediate system, configured to communicate with the VCS and at least one backend system; and
a backend roadside assistance processing system, configured to receive data from the intermediate system through a data connection and operable to receive phone calls from the VCS, wherein
the VCS is further configured to:
establish communication with the intermediate system responsive to a roadside assistance request;
transfer vehicle and customer data to the intermediate system;
place a phone call to the backend roadside assistance processing system, including at least a mobile identification number;
wherein, the intermediate system is configured to process transferred data and relay transferred data to the backend roadside system, including the customer extended service plan data;
wherein, the backend roadside system is configured to compare the mobile identification number from the VCS with data received from the intermediate system to formulate a dispatch order, and wherein
the backend roadside system is further configured to dispatch roadside assistance in accordance with the dispatch order.

2. The system of claim 1, wherein the intermediate system is configured to determine customer eligibility for roadside assistance.

3. The system of claim 1, wherein the backend roadside assistance system is configured to determine customer eligibility for roadside assistance.

4. The system of claim 1, wherein the intermediate system is configured to relay vehicle data to an original equipment manufacturer (OEM) backend system for processing.

5. The system of claim 1, wherein the intermediate system is configured to translate vehicle diagnostic data into legible English diagnostic data.

\* \* \* \* \*